United States Patent [19]
Türl et al.

[11] Patent Number: 5,967,251
[45] Date of Patent: Oct. 19, 1999

[54] BEARING ARRANGEMENT FOR AN INTERNAL COMBUSTION ENGINE

[75] Inventors: Julius Türl, Leutenbach; Walter Pungartnik, Vaihingen, both of Germany

[73] Assignee: Dr. Ing. H.C.F. porsche AG, Germany

[21] Appl. No.: 08/877,576

[22] Filed: Jun. 17, 1997

[30] Foreign Application Priority Data

Jul. 12, 1996 [DE] Germany .......................... 196 28 181

[51] Int. Cl.[6] .................................................. B60R 5/04
[52] U.S. Cl. ........................ 180/297; 180/300; 248/647
[58] Field of Search .................................. 180/297, 300; 248/647, 675, 638, 634, 635

[56] References Cited

U.S. PATENT DOCUMENTS

| | | | |
|---|---|---|---|
| 3,825,090 | 7/1974 | Runkle et al. ........................... | 180/300 |
| 4,449,603 | 5/1984 | Langwieder et al. .................... | 180/297 |
| 4,667,764 | 5/1987 | Sawada et al. ........................... | 180/297 |
| 4,901,814 | 2/1990 | Von Broock et al. .................... | 180/297 |
| 5,074,374 | 12/1991 | Ohtake et al. ........................... | 180/300 |

FOREIGN PATENT DOCUMENTS

| | | |
|---|---|---|
| 0108000A1 | 5/1984 | European Pat. Off. . |
| 0297226B1 | 1/1989 | European Pat. Off. . |
| 0344415A1 | 12/1989 | European Pat. Off. . |
| 0348253A1 | 12/1989 | European Pat. Off. . |

OTHER PUBLICATIONS

Search Report, Dec. 10, 1997, Europe.

*Primary Examiner*—Paul N. Dickson
*Assistant Examiner*—Lynda Jasmin
*Attorney, Agent, or Firm*—Evenson, McKeown, Edwards & Lenahan, P.L.L.C.

[57] ABSTRACT

A bearing arrangement for an internal-combustion engine forms a unit with a transmission and is mounted transversely in a body of a vehicle is held on the vehicle body by way of at least one bearing and at least one torque support.

8 Claims, 4 Drawing Sheets

BEARING ARRANGEMENT FOR AN INTERNAL COMBUSTION ENGINE

BACKGROUND AND SUMMARY OF THE INVENTION

This application claims the priority of German application 196 28 181.4 filed in Germany on Jul. 12, 1996, the disclosure of which is expressly incorporated by reference herein.

The invention relates to a bearing arrangement for an internal-combustion engine which forms a unit with a transmission, which unit is mounted transversely of a vehicle driven thereby and is held on the vehicle body by way of at least one bearing and one torque support.

From European Patent Document EP 0 297 226 B1, a bearing arrangement for an internal-combustion engine is known by way of which an engine transmission unit is held in the vehicle body. The bearing arrangement for the unit installed transversely in the vehicle consists of two torque supports connected with the front wall of the body and arranged vertically offset with respect to one another. Additional elastic bearings are provided on the engine and on the transmission case. These bearings are arranged on both sides of a center-of-mass plane.

It is an object of the invention to provide an improved bearing arrangement for a drive assembly in a motor vehicle which, in addition to a simple construction, has a space-saving arrangement of the bearings. Furthermore, a targeted support in the case of the charge cycle forces is to be ensured.

According to the invention, this object is achieved by means of an arrangement of the above referred to type, wherein a first elastic bearing is arranged on the transmission case and second and third additional bearings are arranged on a face of the engine compartment, said second bearing being constructed as an elastic stop bearing and said third bearing comprising a torque support which extends against a vehicle driving direction, and wherein the first and second bearings are arranged on the transmission case approximately in a horizontal plane.

The principal advantages achieved by means of the invention are that, for the bearing arrangement of the drive assembly, only three bearings are required, a torque support and a stop bearing being provided on the frontal side of the engine compartment. Another bearing is fastened on the transmission case. The bearings are arranged such locally with respect to the drive unit that a targeted movement of the drive assembly, particularly in the case of charge cycle forces and in the case of an idling vibration is achieved and the bearings, in addition, can be arranged in low-vibration areas. During the idling vibration, the drive assembly will swivel about a swivel axis extending through the two upper bearings. In the case of charge cycle reactions, an imaginary swivel axis will occur between the three bearings.

The stop bearing, together with the bearing fastened on the transmission case, is provided approximately in a horizontal plane by means of which a swivel axis of the drive assembly is formed which extends slightly diagonally with respect to this plane.

The stop bearing has an elastic bearing element with stops which are constructed in the longitudinal direction of the vehicle and may have an elastic construction. As a result, an elastic limitation of the swivel movement about the swivel axis is to take place. In particular, one stop has a curved construction and the opposite stop has a plane construction which permits an optimal stop function during a swivel movement of the drive assembly.

The elastic bearings for forming the swivelling axis are preferably constructed with a horizontal axis, whereas the stop bearing has a vertical axis. The bearing on the transmission case is arranged on the top side of the case so that the drive assembly virtually hangs on this bearing. The two other bearings are arranged such that the drive assembly stands on these bearings.

Other objects, advantages and novel features of the present invention will become apparent from the following detailed description of the invention when considered in conjunction with the accompanying drawings.

DETAILED DESCRIPTION OF THE DRAWINGS

Figure 1:
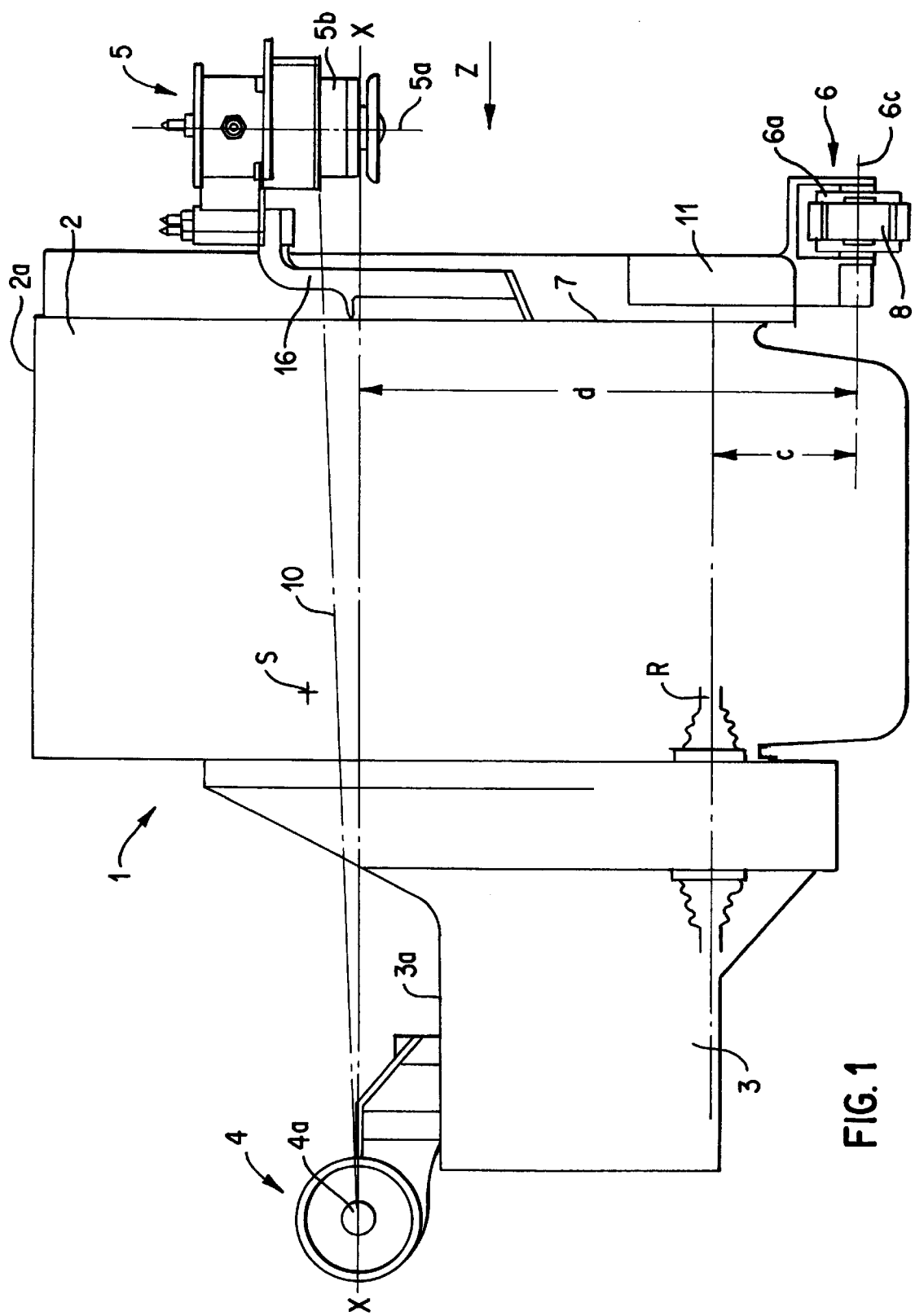
FIG. 1 is a frontal view of a drive unit having three bearing arrangements, constructed in accordance with a preferred embodiment of the present invention.

The bearing arrangement for a drive unit 1 mounted transversely in a motor vehicle, which consists of an internal-combustion engine 2 with a connected transmission 3, is elastically supported on the vehicle body by way of three bearings 4, 5 and 6, on the face 7 of the engine compartment 2a, a first bearing 5 constructed as a stop bearing and a torque support 8 having the second bearing 6 are arranged above one another with a vertical distance a. The bearing 4 on the transmission case 3a is arranged on the top side of the housing 3a so that the unit hangs on this bearing 4.

The stop bearing 5 and the bearing 4 are arranged in an approximately horizontally extending plane X—X, the bearings 4 and 5 forming a swivel axis 10 for the drive assembly in the operation. Below the stop bearing 5, the elastic bearing element 6a of the torque support 8 is connected by way of a console 11 with the engine compartment 2a. On this bearing element 6a, the torque support 8 is held which, by way of another elastic bearing element 6b, is supported on the free end, which faces away, on the vehicle body. The torque support 8 extends approximately against the driving direction F in the longitudinal direction of the vehicle and is held at least in a horizontal plane.

The bearing 4 as well as the bearing element 6a of the torque support 8 have horizontally extending bearing axes 4a and 6c, the axis 4a extending in the longitudinal direction of the vehicle and the axis 6c extending in the transverse direction of the vehicle. In contrast, the stop bearing 5 has a vertically extending axis 5a. The bearing axis 6c of the bearing 6 is provided below wheel drive shafts R, in which case the distance c is smaller than the distance d of the bearing axis from the plane X—X of the bearing 5.

The bearing 4 on the transmission case 3a is arranged on the top side of the case so that the transmission 3 virtually hangs. The engine bearing 5 is situated on the face in a standing manner approximately at the level of the cylinder head. The swivel axes 4a and 5a of both bearings 4, 5 are situated above the center of gravity S. The additional bearing 6 is used as a torque support and is supported against the two engine and transmission bearings.

The stop bearing 5 comprises an elastic bearing element 5b which, by way of a U-shaped console element 14 surrounding the bearing 5, is connected with the vehicle body on the one hand, and on the other hand, by way of a holding element 15 and an angle 16, with the vehicle body.

In the center, the holding element 15 has a receiving device 17 for a screw 18 of the bearing 5. At a distance from this receiving device 17, parallel stop faces 19 and 20 are provided which correspond with the stop faces 21, 22 of the holding element 15. The stop faces 21, 22 have a curved construction and consist of elastic elements 23, 24. In contrast, the opposite stop faces 19 and 20 have a plane alignment and each consist of a plate. These stop faces 19, 20 may also have an elastic element behind the plate.

Figure 2:
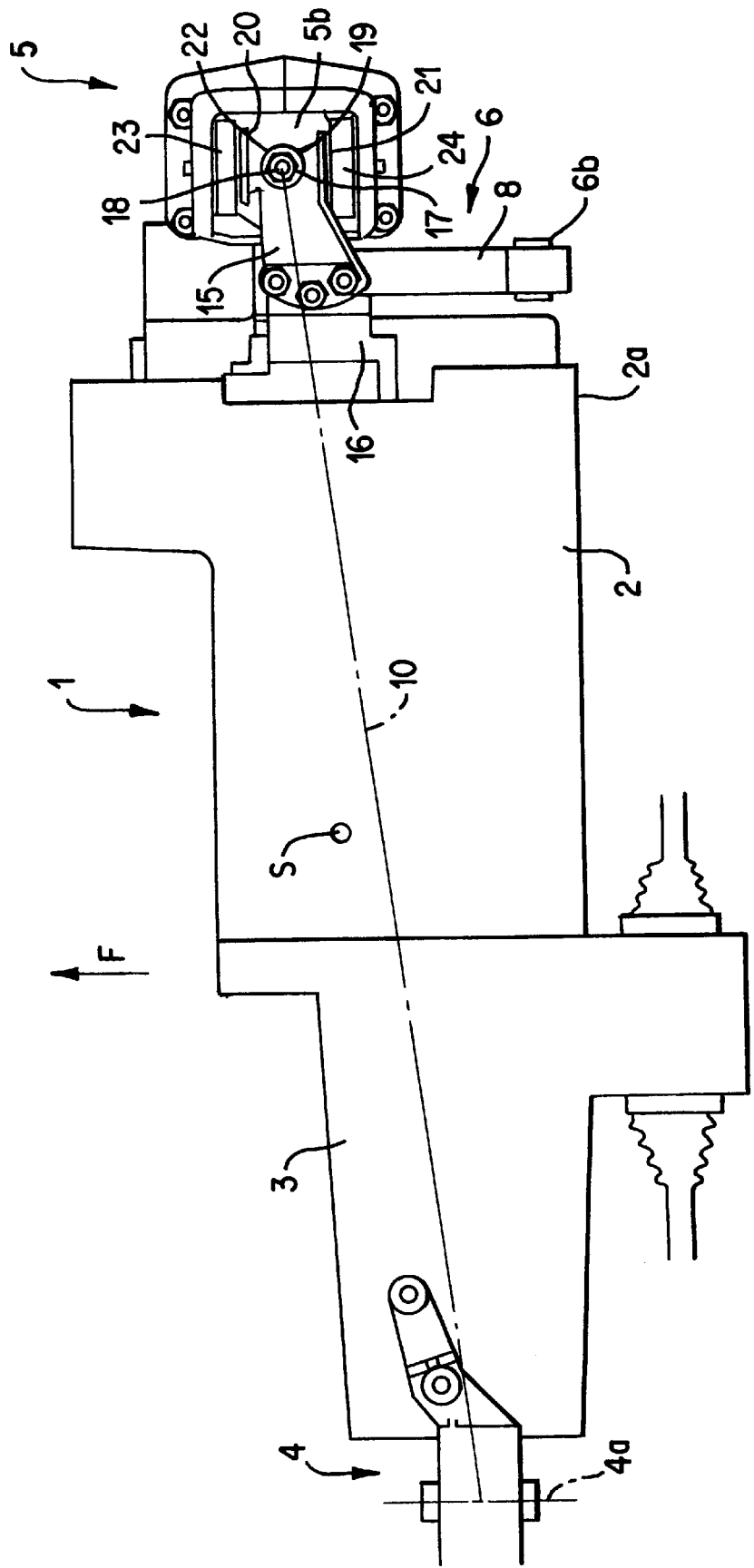
FIG. 2 is a top view of the drive unit of FIG. 1 having three bearing arrangements.
Figure 3:
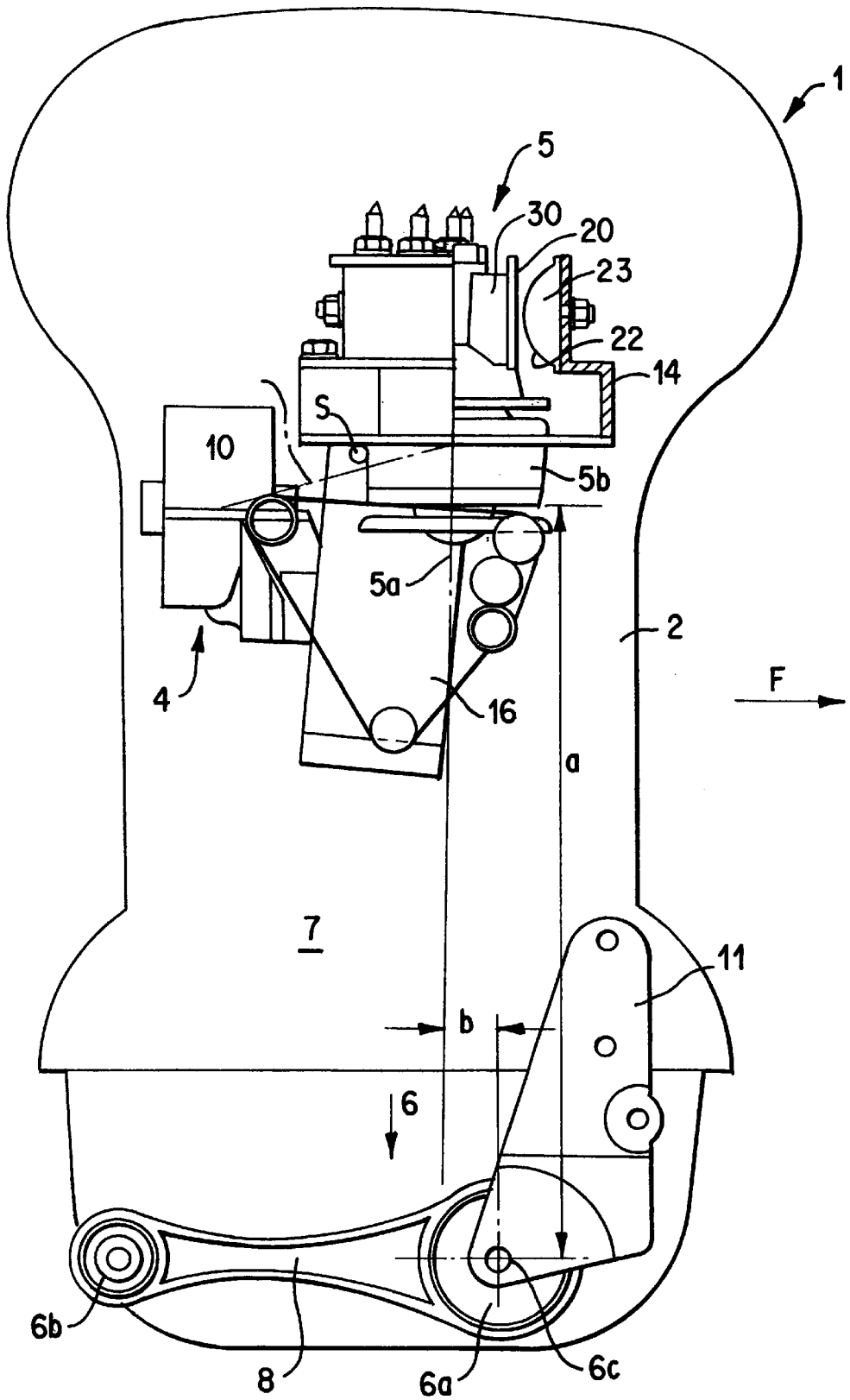
FIG. 3 is a view of the face of the drive unit taken in the direction of the arrow Z of FIG. 1.
Figure 4A:
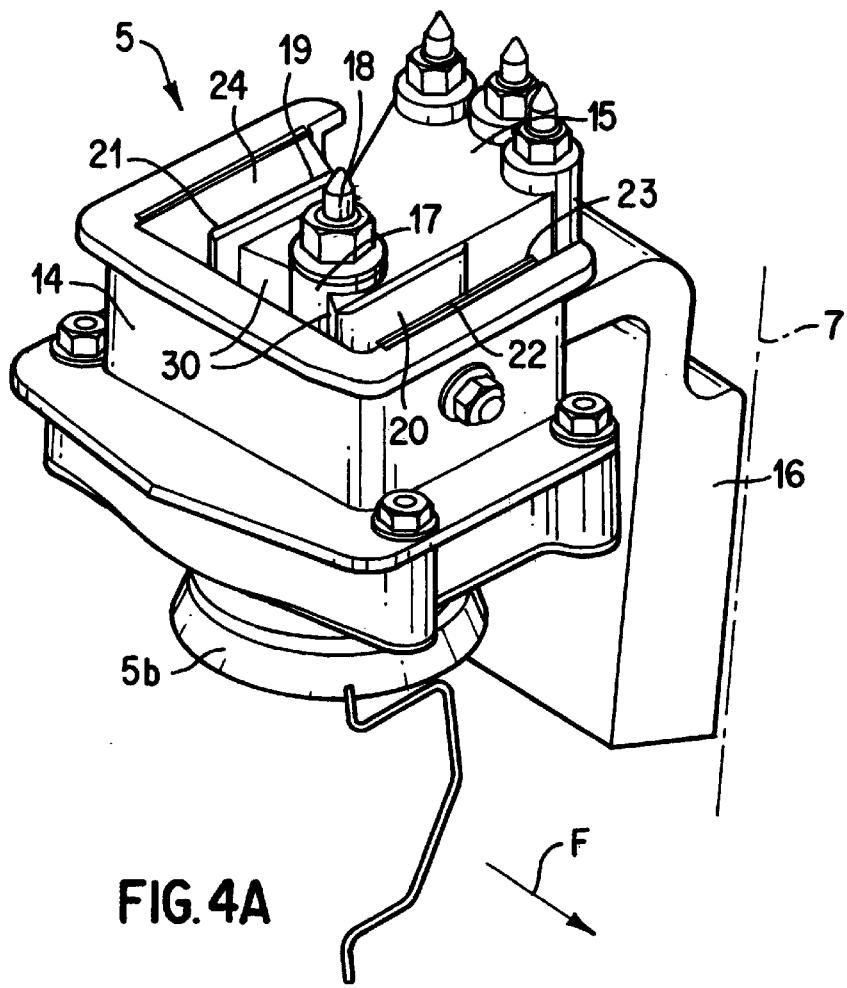
FIG. 4A is a diagrammatic perspective representation of the stop bearing of the arrangement of FIG. 1.
Figure 4B:
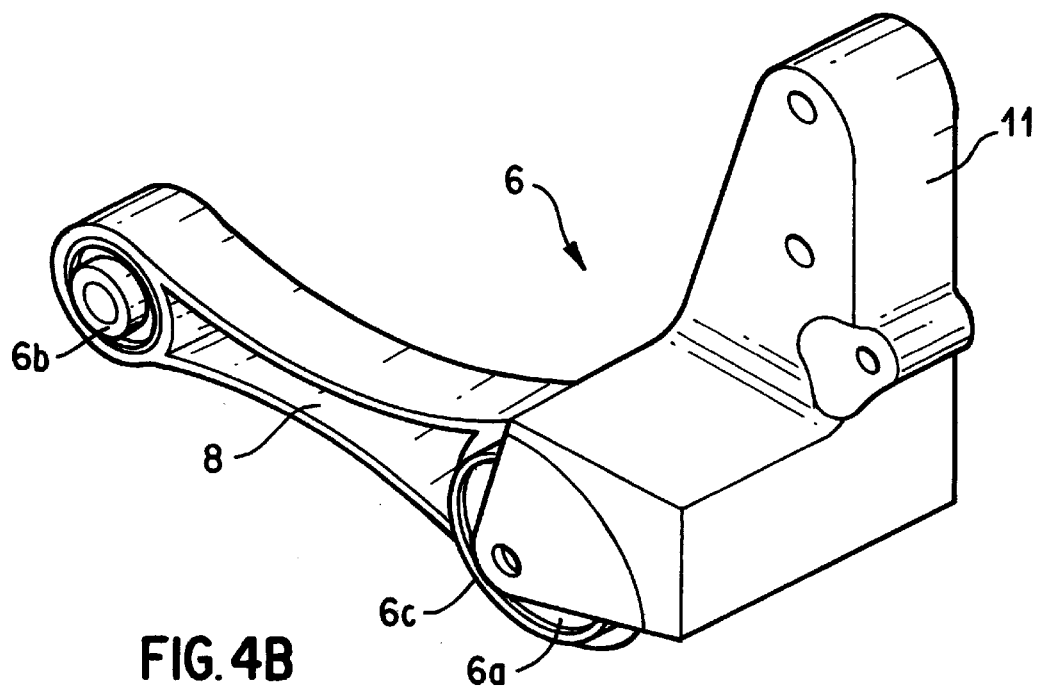
FIG. 4B is a diagrammatic perspective representation an elastic bearing with a torque support arranged underneath arranged according to the arrangement of FIGS. 1–3.

As illustrated in detail in FIG. 2, the drive unit 1 is therefore limited during possible swivelling movements about the axis 10 with respect to its movements in that the stops 19 or 20 strike against the opposite elastic elements 24 or 23 and optimally limit a swivelling of the drive unit 1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Bearing arrangement for an internal-combustion engine which forms a unit with a transmission, is mounted transversely in a body of a vehicle driven thereby and is held on the body by way of at least one bearing and at least one torque support, wherein a first elastic bearing is arranged on a transmission case and a second and third additional bearings are arranged on a face of the engine compartment, said second bearing being constructed as an elastic stop bearing and said third bearing comprising a torque support, said torque support extends against a vehicle driving direction, wherein the first and second bearings are arranged approximately in a horizontal plane, and wherein the second bearing has a standing elastic bearing element which, on the one hand, is connected with a side member of the vehicle body and, on the other hand, is connected with a holding element fastened on the engine compartment, the holding element having stop faces which act in a longitudinal direction of the vehicle and which are arranged corresponding to stop faces with stationary elastomer cushions fastened on interior surfaces of a U-shaped console element and said elastomer cushions have a curved surface coarse, whereas the stop faces have a plane construction.

2. Bearing arrangement according to claim 1, wherein the first bearing has a bearing axis aligned in a longitudinal direction of the vehicle wherein the second bearing has a vertically extending bearing axis, and wherein a bearing element of the third bearing of the torque support has a bearing axis extending transversely to the vehicle.

3. Bearing arrangement according to claim 2, wherein the second bearing is arranged on the face of the engine compartment above the torque support at a vertical distance, and wherein an elastic bearing element of the torque support arranged in a console held on the body side is situated at a horizontal distance from a bearing element of the second bearing.

4. Bearing arrangement according to claim 1, wherein the second bearing is arranged on the face of the engine compartment above the torque support at a vertical distance, and wherein an elastic bearing element of the torque support arranged in a console held on the body side and is situated at a horizontal distance from a bearing element of the second bearing.

5. Bearing arrangement according to claim 1, wherein the holding element is connected by way of an angle directly with the face of the engine compartment.

6. Bearing arrangement according to claim 1, wherein the stop faces are arranged in parallel to one another on both sides of a receiving device for a screw of the second bearing in the holding element.

7. Bearing arrangement according to claim 1, wherein one elastomer cushion respectively is provided between the stop faces and the holding element.

8. Bearing arrangement according to claim 1, wherein the third bearing has a bearing axis which is arranged below wheel drive shafts.

* * * * *